Patented June 9, 1942

2,285,516

UNITED STATES PATENT OFFICE 2,285,516

MANUFACTURE OF SOLUBLE NITRO DYE-STUFFS AND THEIR APPLICATION

Arthur Howard Knight and Frank Howard Pearman, Blackley, Manchester, England, assignors to Imperial Chemical Industries Limited, a corporation of Great Britain No Drawing. Application July 27, 1939, Serial No. 286,928. In Great Britain August 2, 1938

15 Claims. (Cl. 260—475)

This invention relates to the manufacture of new water-soluble nitro dyestuffs. It also relates to the use of the said new water-soluble nitro dyestuffs in coloring acetate artificial silk.

This invention has as an object to provide new dyestuffs for coloring acetate artificial silk. A further object is to devise methods whereby such dyestuffs can be manufactured. Further objects will appear hereinafter. These objects are accomplished by the following invention.

We have found that we can color acetate artificial silk with dyestuffs which consist of or contain as their coloring ingredient soluble salts of hydroxyalkyl-amino- or hydroxyalkyl-oxy-nitro-diphenylamine esters of dicarboxylic acids as more particularly defined below.

The said salts are compounds of the following general formula, viz.,

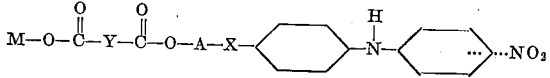

in which the NO₂ group occupies any one of the free positions on the benzene ring, and in which there may be neutral monovalent substituents as defined below, and in which A stands for $-C_2H_4-$, $-C_3H_6-$, or $-C_4H_8-$,
X stands for $-O-$ or

where R is hydrogen or alkyl (methyl to butyl),

M stands for sodium, potassium, ammonium or other salt forming cation yielding a soluble dyestuff, and the meaning of Y is shown by stating that

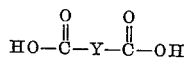

would stand for phthalic acid, a halogenated phthalic acid, malonic acid or a homologue thereof in which the number of carbon atoms is not more than 6. It will be noted that these dibasic acids are characterized by being per se more or less soluble in water (especially, hot water), and by giving water-soluble alkali-metal salts.

The neutral monovalent substituents above mentioned are the usual acetate artificial silk dyestuffs substituents, for instance chloro, methanesulphonyl, nitro (in addition to the one shown in the general formula) and methoxy substituents, but excluding the solubilising carboxy and sulpho substituents, nuclear or otherwise.

According to the invention we make the new dyestuffs by either of the two following processes, namely:

(1) Esterifying a substituted nitrodiphenylamine of the general formula

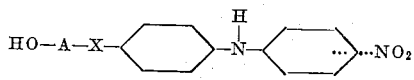

in which A and X stand for the same as before, by treatment with substantially an equimolecular proportion of the anhydride of a dicarboxylic acid of general formula Y.(CO₂H)₂ as above, and then coverting to a soluble salt if necessary.

The esterification is conveniently effected by heating the starting materials together in a suitable solvent, e. g., toluene or pyridine. The substituted nitrodiphenylamines may be made, for instance, by interacting appropriate halogenonitrobenzene derivatives containing replaceable halogeno or nitro substituents with an appropriate amine of the benzene series.

(2) Reacting a substituted amine of the benzene series of the general formula

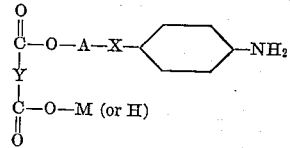

in which A, X, M and Y stand for the same as before, and in which the phenylene ring may be further substituted as already indicated, with an appropriate nitrohalogenobenzene carrying a replaceable halogen or nitro substituent and also carrying if desired a further substituent or substituents as already indicated, and then converting to soluble salts if necessary.

Also according to the invention we color acetate artificial silk with the dyestuffs.

The following examples, in which parts are by weight, illustrate but do not limit the invention.

*Example 1*

31.9 parts of 2:4-dinitro-4'-β-hydroxyethoxy-diphenylamine are dissolved in 300 parts of dry toluene and to the solution there are added 10 parts of succinic anhydride. The mixture is boiled under a reflux condenser for 5 hours, allowed to cool and filtered. The acid succinic ester of 2:4-dinitro-4'-β-hydroxyethoxydiphenylamine is obtained in good purity as a red crystalline substance of M. P. 128° C. The pure compound may be obtained by recrystallisation from ethyl alcohol melts at 132° C.

The ester is suspended in hot water, and sufficient sodium bicarbonate added to convert it to its sodium salt, which is then precipitated by cooling and addition of sodium chloride, filtered and dried. It is obtained as a yellow powder which is soluble in hot water to a yellow solution. It has the probable formula

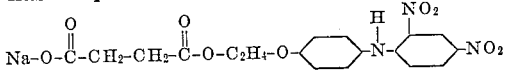

The potassium salt may be obtained in a similar way by using potassium bicarbonate.

*Example 2*

2 parts of the potassium salt of the acid succinic ester of 2:4-dinitro-4'-β-hydroxyethoxydiphenylamine obtained as in Example 1 are dissolved in 500 parts of warm water and the solution diluted with hot water to give a total of 3000 parts. The temperature is adjusted to 80° C. and 10 parts of sodium chloride are added.

100 parts of acetate artificial silk yarn are treated for 15 minutes at 15° C. in 3000 parts of water containing 3 parts of neutral soap and 3 parts of ammonia (e. g. 0.88), well rinsed in water and then put into the above dyebath. After dyeing for 15 minutes at 80–85° C. 10 parts of sodium chloride are added, then after dyeing for another 15 minutes at the same temperature another 10 parts of sodium chloride are added. The yarn is well turned during dyeing and at the end is removed from the dyebath, rinsed and dried. The yarn is colored a clear yellow shade. The dyeing has good fastness properties.

*Example 3*

To a solution of 30.2 parts of the sodium salt of 4-amino-1-(NN-ethyl-β-hydroxyethylamino) benzene acid succinic ester in 400 parts of water are added 8.5 parts of sodium bicarbonate and 20.3 parts of 1-chloro-2:4-dinitrobenzene. The mixture is heated at 60–70° C. for 2 hours with stirring. The solium salt of 2:4-dinitro-4'-(NN-ethyl-β-hydroxyethylamino) diphenylamine acid succinic ester so obtained is precipitated by the addition of sodium chloride. It is purified if necessary by recrystallisation from water and dried at a moderate temperature. It dyes acetate artificial silk in yellowish-brown shades when applied by the method of Example 2. It has the probable formula

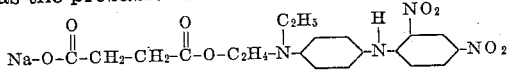

4-amino-1-(NN-ethyl-β-hydroxyethylamino) benzene acid succinic ester can be obtained by coupling a diazotised unsulphonated amine of the benzene series (for example aniline or o chloroaniline) with the sodium salt of NN-ethyl-β-hydroxyethylaniline acid succinic ester in the presence of a slight excess of sodium carbonate, reducing the monoazo compound so obtained in neutral aqueous medium by means of sodium hydrosulphite, rendering the cold reduction mixture jointly alkaline with sodium carbonate and extracting therefrom the regenerated diazotisable amine of the benzene series (e. g. aniline or o-chloroaniline) with ether. The aqueous residue contains the sodium salt of 4-amino-1-(NN-ethyl-β-hydroxyethylamino) benezene acid succinic ester which can be isolated therefrom or alternatively such an aqueous solution can be used directly for the condensation with 1-chloro-2:4-dinitrobenzene.

*Example 4*

34.6 parts of 2:4-dinitro-4'-NN-ethyl-β-hydroxyethylaminodiphenylamine are dissolved in 400 parts of dry toluene and 15.5 parts of phthalic anhydride are added. The mixture is boiled under reflux for 12 hours. The toluene is then removed by steam distillation and the residue extracted with sufficient warm dilute sodium carbonate to convert the 2:4-dinitro-4'-(NN-ethyl-β-hydroxyethylamino) diphenylamine phthalic acid ester so obtained into its sodium salt. The solution of the sodium salt so obtained is filtered from any tarry matter and the new diphenylamine derivative salted out from the filtrate by the cautious addition of common salt. It is then dried. It dyes actate artificial silk in yellowish-brown shades similar to those given by the dyestuff of Example 3. It has the probable formula

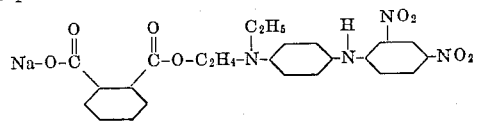

*Example 5*

31.9 parts of 2:4-dinitro-4'-β-hydroxyethoxydiphenylamine are heated with 20.4 parts of 3-chlorophthalic anhydride at 140–150° C. for 3 hours. The product is then extracted with hot alcohol which on cooling deposits in good yield the desired 3-chlorophthalic monoester in red needles, M. P. 152° C. The monoester is then converted into its sodium salt in the manner described in Example 1. It dyes acetate artificial silk in yellow shades of good fastness properties when applied according to the method of Example 2. It has the probable formula

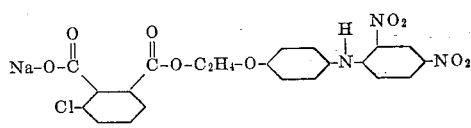

*Example 6*

35.3 parts of 2:4-dinitro-3'-chloro-4'-β-hydroxyethoxydiphenylamine (M. P. 139° C., obtained by condensing 1-chloro-2:4-dinitrobenzene with 2-chloro-4-aminophenyl-β-hydroxyethyl ether in ethanol in the presence of anhydrous sodium carbonate) are dissolved in 200 parts of dry toluene and to the solution there are added 10.5 parts of succinic anhydride. The mixture is boiled under reflux for 2 hours, allowed to cool and filtered. The acid succinic ester of 2:4-dinitro-2'-chloro-4'-β-hydroxyethoxydiphenylamine is obtained in 80% yield and has M. P. 126° C. It is converted to its sodium salt by the method of Example 1, and dyes acetate artificial silk in somewhat greenish-yellow shades of good fastness properties. The sodium salt has the probable formula

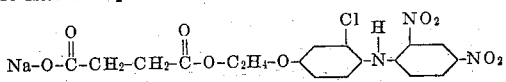

*Example 7*

33.3 parts of 2:4-dinitro-4'-γ-hydroxypropyloxydiphenylamine (M. P. 104° C., obtained by reacting 1-chloro-2:4-dinitrobenzene with p-aminophenyl-γ-hydroxypropyl ether in ethanol in the presence of sodium carbonate) are reacted with 10 parts of succinic anhydride according to the method of Example 1. The acid succinic ester of 2:4-dinitro-4'-γ-hydroxypropyloxydiphenylamine is obtained which is converted to its sodium salt by the method of Example 1. It dyes acetate artificial silk in yellow shades very similar to those given by the dyestuffs of Example 1. It has the probable formula

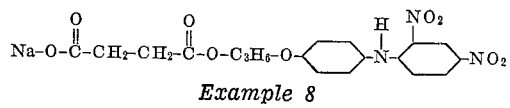

Example 8

38.8 parts of 4'-β-hydroxyethoxy-2-nitrodiphenylamine-4-methyl-sulphone (M. P. 152° C., obtained by reacting 1-chloro-2-nitrobenzene-4-methyl-sulphone with p-aminophenyl-β-hydroxyethyl ether in ethanol in the presence of an acid binding agent) are monoesterified by reacting with 10 parts of succinic anhydride according to the method of Example 1. After conversion of the 4'-β-hydroxyethoxy-2-nitrodiphenylamine-4-methylsulphone succinic acid ester (orange powder, M. P. 144° C.) to its sodium salt by the method of Example 1, the new dyestuff is obtained as orange crystalline plates which dissolve readily in warm water and dye acetate artificial silk in reddish-yellow shades of very good fastness to light when applied by the method of Example 2. It has the probable formula

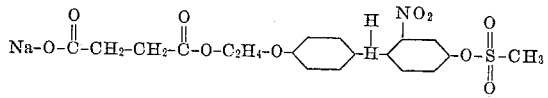

Example 9

30.8 parts of 5-chloro-2-nitro-4'-β-hydroxyethoxy-diphenylamine (M. P. 124° C., obtained by reacting 1-chloro-3:4-dinitrobenzene with p-aminophenyl-β-hydroxyethyl ether in ethanol in the presence of an acid binding agent) are dissolved in 200 parts of dry toluene and to the solution so obtained there are added 10 parts of succinic anhydride. The mixture is boiled under reflux for 5 hours, the toluene is then removed by steam distillation, and the residue extracted with just sufficient hot dilute sodium bicarbonate to convert the 5-chloro-2-nitro-4'-β-hydroxyethoxydiphenylamine succinic acid ester to its sodium salt. The solution of the sodium salt so obtained is filtered if necessary and the sodium salt of the new dyestuff is precipitated by addition of common salt. It is filtered off and dried. It dyes acetate artificial silk in reddish-yellow shades. It has the probable formula

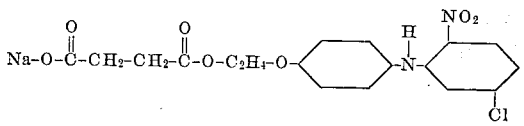

Example 10

34.6 parts of 2:4-dinitro-4'-(NN-ethyl-β-hydroxyethylamino)-diphenylamine and 15 parts of adipic anhydride are heated together at about 140° C. for 3 hours. The resulting product, which is mainly 2:4-dinitro-4'-(NN-ethyl-β-hydroxyethylamino) diphenylamine adipic acid ester, is separated from a small amount of contaminating tarry material by extraction with boiling ethanol, the alcoholic solution diluted with an equal volume of water and sodium bicarbonate added in sufficient amount to form the sodium salt of the new adipic acid ester dyestuff. The sodium salt separates on cooling the solution and is filtered off and dried at a moderate temperature. It is soluble in warm water and dyes acetate artificial silk in yellowish-brown shades when applied by the method of Example 2. It has the probable formula

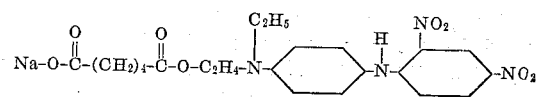

Example 11

To a solution of 27.5 parts of the sodium salt of p-amino-phenol-β-hydroxyethyl ether acid succinic ester in 300 parts of water are added 8.5 parts of sodium bicarbonate and 20.3 parts of 1-chloro-2:4-dinitrobenzene, and the resulting mixture is stirred at 60–70° C. for 2 hours. The 2:4-dinitro-4'-β-hydroxyethoxydiphenylamine acid succinic ester sodium salt so obtained is then isolated by precipitation with sodium chloride and filtering. It is dried at a moderate temperature. It is identical with the dyestuff of Example 1.

p-Aminophenyl-β-hydroxyethyl ether acid succinic ester is obtained by reacting equimolecular proportions of p-nitrophenyl-β-hydroxyethyl ether and succinic anhydride in boiling toluene to give p-nitrophenyl-β-hydroxyethyl ether acid succinic ester which is then reduced to the amine with sodium hydrosulphite in a neutral aqueous medium.

The invention is further illustrated by the examples listed in the following table:

| Example No.— | Hydroxyalkylated-nitro-diphenylamine compound used as starting material | Esterifying agent | Shade of acid ester compound on acetate artificial silk |
| --- | --- | --- | --- |
| 12 | 2:4-dinitro-4'-β-hydroxyethoxydiphenylamine | Glutaric anhydride | Yellow. |
| 13 | ----do---- | 3:4-dichlorophthalic anhydride | Yellow. |
| 14 | 4-chloro-2-nitro-4'-β-hydroxyethoxydiphenylamine (M. P. 78° C., obtained by reacting 2:5-dichloro-1-nitrobenzene with p-aminophenyl-β-hydroxyethyl ether in ethyl alcohol at 130-140° C. under pressure for 16 hours in presence of borax). | Succinic anhydride (M. P. of resulting acid ester 126° C.). | Reddish-yellow. |
| 15 | 2:4-dinitro-2'-methyl-4'-(NN-ethyl-β-hydroxyethylamino) diphenylamine. | Succinic anhydride (M. P. of resulting acid ester 128° C.). | Yellowish-brown. |

This invention is a valuable advance in the art which furnishes a range of fast water soluble dyestuffs for acetate artificial silk in all shades of yellows, including yellowish-browns.

As many apparently widely different embodiments of this invention may be made without departing from the spirit and scope thereof, it is to be understood that the invention is not limited to the specific embodiments thereof except as defined in the appended claims.

We claim:
1. A compound of the general formula

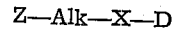

wherein D represents the radical of a nitrated diphenylamine, X stands for a non-carbonic link selected from the group consisting of oxygen and imino radicals, Alk designates an alkylene radical having not more than four carbon atoms, while Z represents the radical of a dibasic carboxylic acid whose alkali-metal salts are water-soluble and which is attached to the Alk radical in the form of an ester by means of one of its

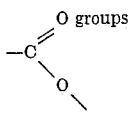

2. A water-soluble dyestuff for acetate artificial silk, being a compound of the general formula Z—Alk—O—D, wherein D represents the radical of a nitrated diphenyl-amine, Alk designates an alkylene radical having not more than four carbon atoms, while Z represents the radical of a dibasic carboxylic acid whose alkali-metal salts are water-soluble and which is attached to the Alk radical in the form of an ester by means of one of its

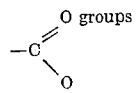

3. A water-soluble dyestuff for acetate artificial silk, being a compound of the general formula Z—Alk—NR'—D, wherein D represents the radical of a nitrated diphenyl-amine, R' stands for a member of the group consisting of hydrogen and lower alkyl radical, Alk designates an alkylene radical having not more than four carbon atoms, while Z represents the radical of a dibasic carboxylic acid whose alkali-metal salts are water-soluble and which is attached to the Alk radical in the form of an ester by means of one of its

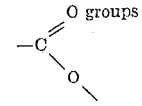

4. A water-soluble dyestuff for acetate artificial silk, being a compound of the general formula

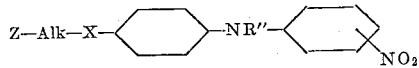

wherein R'' stands for a member of the group consisting of hydrogen and lower alkyl radicals, and wherein the remaining free positions of the phenylene nuclei are occupied by members of the group consisting of hydrogen and neutral monovalent substituents; X stands for a non-carbonic link selected from the group consisting of oxygen and imino radicals, Alk designates an alkylene radical having not more than four carbon atoms, while Z represents the radical of a dibasic carboxylic acid whose alkali-metal salts are water-soluble and which is attached to the Alk radical in the form of an ester by means of one of its

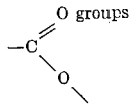

5. A compound of the general formula

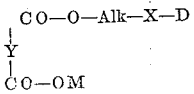

wherein D represents the radical of a nitrated diphenylamine, X is an atomic bridge selected from the group consisting of oxygen and imino, Alk designates an alkylene radical having not more than four carbon atoms, Y represents an alkylene radical of not more than 4 carbon atoms, while M stands for a water-solubilizing cation.

6. A compound of the general formula

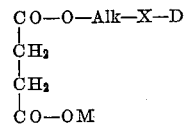

wherein D represents the radical of a nitrated diphenylamine, X is an atomic bridge selected from the group consisting of oxygen and imino, Alk designates an alkylene radical having not more than four carbon atoms, while M stands for a water-solubilizing cation.

7. A compond of the general formula

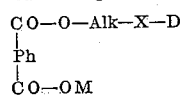

wherein D represents the radical of a nitrated diphenylamine, X is an atomic bridge selected from the group consisting of oxygen and imino, Alk designates an alklene radical having not more than four carbon atoms, Ph represents a phenylene radical, while M stands for a water-solubilizing cation.

8. A dyestuff compound of the general formula

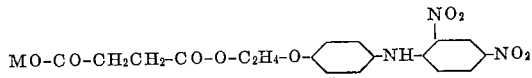

wherein M stands for a water-solubilizing cation.

9. A dyestuff compound of the general formula

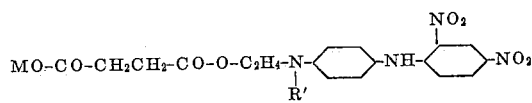

wherein R' stands for a member of the group consisting of hydrogen and lower alkyl radical, while M stands for a water-solubilizing cation.

10. A dyestuff compound of the general formula

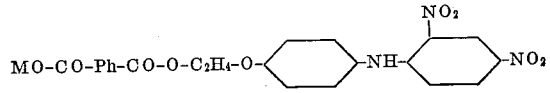

wherein Ph represents a phenylene radical, while M stands for a water-solubilizing cation.

11. A process for producing a water-soluble dyestuff for acetate artificial silk, which comprises subjecting an intermediate of the general formula

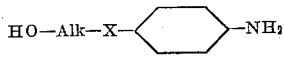

wherein Alk is an alkylene radical having not over four carbon atoms while X is a link selected from the group consisting of oxygen and the imino radicals, in optical order, to condensation with a nitrated halogen benzene and to esterification with substantially equimolecular proportion of a anhydride of a dibasic carboxylic acid whose alkali-metal salts are water soluble.

12. A process as in claim 11, the resulting compound being subjected further to neutralization, to convert the remaining free carboxy group of the dibasic acid into a water-soluble salt thereof.

13. The process of converting a diphenylamine-dyestuff into a water-soluble form suitable for dyeing acetate artificial silk, which comprises esterifying by the aid of the anhydride of a water-soluble dibasic carboxylic acid a nitrated diphenylamine having in one of the phenyl nuclei a side-chain selected from the group consisting of hydroxy-alkyloxy and hydroxy-alkylimino.

14. The process of converting a diphenylamine-dyestuff into a water-soluble form suitable for dyeing acetate artificial silk, which comprises reacting, in substantially equimolecular proportions, with the anhydride of a water-soluble dibasic acid upon a compound of the general formula HO—Alk—X—D, wherein D represents the radical of a nitrated diphenylamine, X stands for a noncarbonic link selected from the group consisting of oxygen and imino radicals, and Alk represents an alkylene radical having not more than four carbon atoms.

15. A process as in claim 14, including further the step of converting the remaining carboxy group of the dibasic acid into a water-soluble salt thereof.

ARTHUR HOWARD KNIGHT.
FRANK HOWARD PEARMAN.

CERTIFICATE OF CORRECTION.

Patent No. 2,285,516.  June 9, 1942.

ARTHUR HOWARD KNIGHT, ET AL.

It is hereby certified that error appears in the printed specification of the above numbered patent requiring correction as follows: Page 2, first column, line 67, for "benezene" read --benzene--; page 3, first column, line 25-30, for "$\overset{H}{\underset{H}{|}}$" read --$\overset{H}{\underset{N}{|}}$--; page 4, first column, line 28, for "radical" read --radicals--; and second column, line 23, for "alklene" read --alkylene--; line 39, for "radical" read --radicals--; line 63, for "a" before "anhydride" read --the--; and that the said Letters Patent should be read with this correction therein that the same may conform to the record of the case in the Patent Office.

Signed and sealed this 25th day of August, A. D. 1942.

Henry Van Arsdale,
Acting Commissioner of Patents.

(Seal)